United States Patent

[72] Inventors  Leroy N. Larenzo
               Houston, Tex.;
               Mark P. Banjavich, New Orleans, La.
[21] Appl. No.  738,458
[22] Filed       June 20, 1968
[45] Patented    Jan. 26, 1971
[73] Assignee    Taylor Diving & Salvage Co., Inc.
                 New Orleans, La.
                 a corporation of Louisiana

[11] 3,558,852

[54] ELECTRIC HEATING APPARATUS FOR SUPPLYING HEATED FLUID TO A DIVER'S CLOTHING
4 Claims, 5 Drawing Figs.

[52] U.S. Cl. .................................................. 219/211,
     2/2.1, 126/204, 128/402, 165/46, 165/107,
     219/306, 219/380
[51] Int. Cl. ........................................................ B63c 11/28,
     H05b 3/82
[50] Field of Search ............................................ 219/302,
     296—299, 528, 303—309, 373, 380, 381, 382,
     328, 331, 321, 330; 165/1, 104—108, 120, 64, 46;
     126/204—210; 2/2.1; 128/379, 400—403, 254;
     4/160, 165

[56]                   References Cited
                   UNITED STATES PATENTS
3,349,223  10/1967  Barter ........................  219/505X
3,398,259   8/1968  Tregay et al. ................  219/388X
3,417,226  12/1968  Thomiszer ....................  219/505X

*Primary Examiner*—A. Bartis
*Attorney*—Burns, Doane, Swecker & Mathis

ABSTRACT: A method which is intended to supply heated fluid to divers' clothing of the type including a fluid inlet connection communicating with internal fluid circulation passages in the clothing. The method includes the steps of pumping fluid from a source thereof into an enclosed chamber and directing the fluid in a flow path through the chamber to an outlet communicating with the inlet to the diver's clothing. Heat is supplied to the fluid in the flow path to raise the temperature of the fluid. The temperature of the fluid in the flow path subsequent to heating is sensed and the supply of heat to the fluid is reduced whenever the sensed temperature exceeds a predetermined value.

A heating unit which is intended to supply heated fluid to divers' clothing of the type provided with a fluid inlet connection communicating with internal fluid circulation passages in the clothing. The unit includes a housing having an enclosed main chamber. Pump means connected with the housing includes a pump inlet communicating with a source of the fluid and a pump outlet communicating with the main chamber for pumping the fluid therethrough. Chamber outlet means in the housing communicates with the main chamber and is adapted to be connected to the inlet connection of the diver's clothing. The pump outlet and the chamber outlet means are positioned at opposite ends of a fluid flow path through the main chamber. Heating means connected with the housing extends into the flow path for supplying heat to the fluid therein. Temperature responsive means connected with the housing extends into the flow path at a point downstream of the heating means. The temperature responsive means is operatively connected with the heating means to reduce the heat supplied thereby when the temperature of the fluid exceeds a predetermined value.

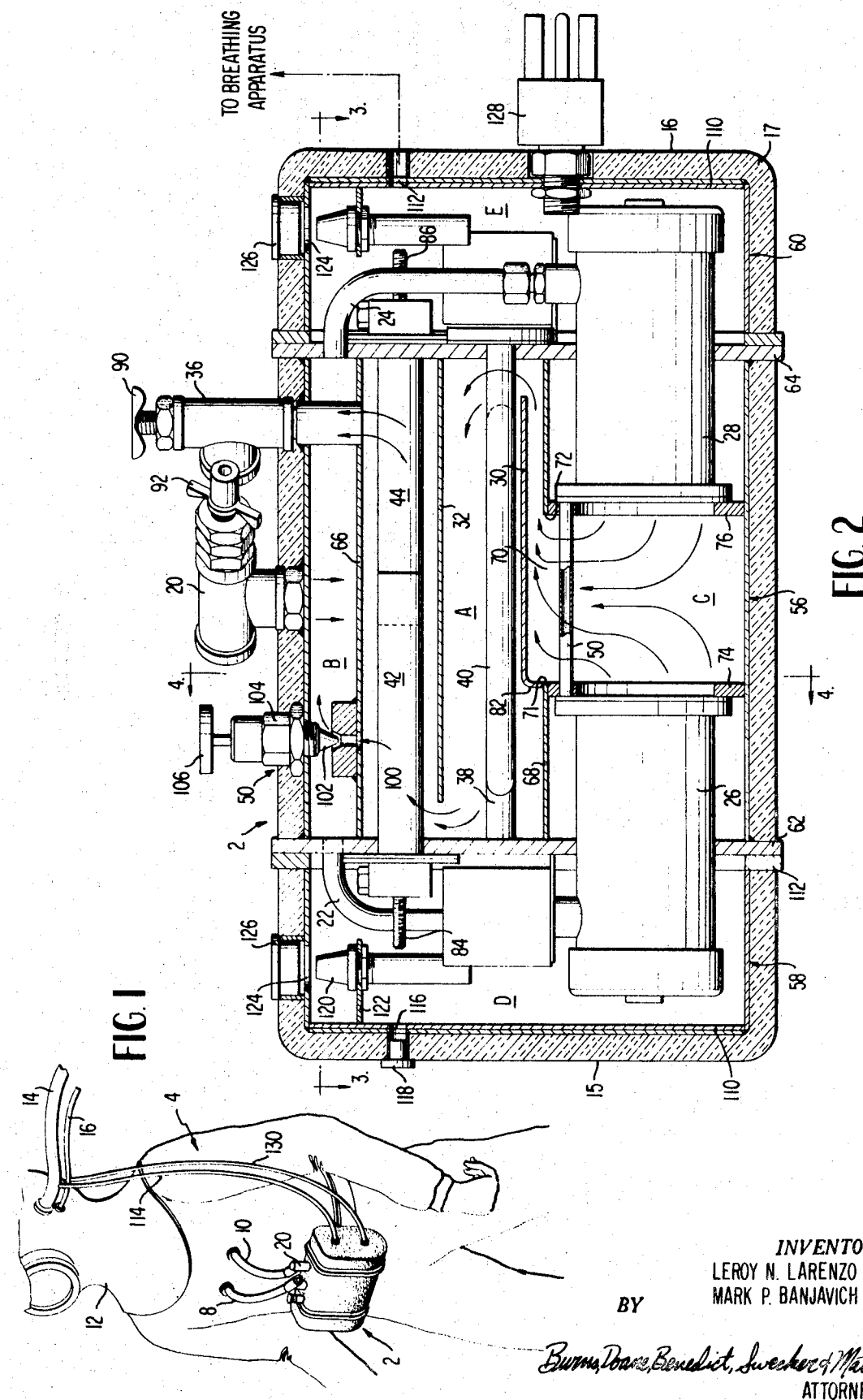

INVENTORS
LEROY N. LARENZO
MARK P. BANJAVICH

BY
*Burns, Doane, Benedict, Swecker & Mathis*
ATTORNEYS

ELECTRIC HEATING APPARATUS FOR SUPPLYING HEATED FLUID TO A DIVER'S CLOTHING

BACKGROUND OF THE INVENTION

This invention relates to a method and apparatus for supplying heated fluid to a diver's clothing.

In performing underwater operations utilizing a diver clad in a diving suit, problems are posed by the loss of the diver's body heat to the surrounding water. This problem is particularly acute when operating at appreciable depths where the water remains at very low temperatures all year round, but may also be encountered in shallow water during winter operations. The rate of loss of body heat may severely restrict the amount of time for which the diver is able to work below the surface of the water before he becomes too cold to continue.

In order, therefore, to permit the diver to continue to work for prolonged periods immersed in cold water, diving suits have recently been developed, having internal fluid circulation passages through which heated fluid may be passed to warm adjacent portions of the diver's body. It will be appreciated that diving suits of this type pose a unique requirement for supplying the heated fluid to the diving suit.

Although it would be possible to supply the heated fluid through flexible fluid conduits extending to suitable apparatus positioned either on a surface vessel or an immersed diving bell, such conduits would be likely to severely restrict the mobility of the diver. In addition, the conduits would be vulnerable to snagging on obstructions, current action and to other hazards. It would, therefore, be desirable to provide a portable heating unit which could by carried by the diver on his person without significantly reducing his mobility.

One previous form of portable underwater unit for thermal purposes, provided portable back mounted gas cylinders for passing air through the walls of a porous, padded diving suit to provide gaseous thermal insulation about the diver's body. Although apparatus of this type may sometimes prove satisfactory, certain operational disadvantages may be anticipated during prolonged periods of operation in the environment presently considered. For example, the fluid delivered by the cylinders is not in itself directly heated and thus could not supply heat to the diver to replace the loss of his body heat to the surrounding water.

Additionally, the period of operation of such a prior device would be limited by the gaseous capacity of the cylinders, as the gas after passing through the suit escapes into the surrounding water and is not recirculated. With such an arrangement the period of operation of the unit may not be sufficiently long for sustained diving operations if the cylinder weight and dimensions are to be kept at a level consistent with unimpaired diver mobility.

Another problem associated with a gaseous, nonrecirculating system of the type described is that the escaping gas may tend to surround the diver with a stream of escaping bubbles which may seriously impair his visibility during working operations.

SUMMARY OF THE INVENTION

It is, therefore, a general object of the invention to provide a method and apparatus for supplying heated fluid to a diver's clothing of the type described, which obviates or minimizes problems of the type previously discussed.

It is another object of the invention to provide a heating unit for supplying heated fluid to a diver's clothing which is compact and may be readily secured to the diver's clothing and yet which provides a sufficient heat output to enable the diver to continue to function indefinitely even in very cold surrounding water.

It is another object of the invention to provide a method and apparatus for supplying heated fluid to a diver's clothing, capable of prolonged operation without imposing size or weight penalties likely to cause impairment of the diver's mobility.

It is a further object of the invention to provide a heating unit for supplying heating fluid to a diver's clothing which operates on a closed fluid cycle to minimize the power required to be expended to maintain the diver in a comfortable condition.

A heating unit according to one preferred embodiment of the invention, is intended for use with diver's clothing of the type provided with a fluid inlet connection communicating with internal fluid circulation passages in the clothing. The heating unit includes a housing having an enclosed main chamber. Pumping means is connected with the housing and includes pump inlet means communicating with a source of the fluid, and pump outlet means communicating with the main chamber for pumping the fluid thereinto. Chamber outlet means in the housing communicating with the main chamber is adapted for connection with the inlet connection of the diver's clothing to supply fluid thereto. The chamber outlet means and the pump outlet means are positioned at opposite ends of a fluid flow path through the main chamber. Heating means connected with the housing extends into the flow path for supplying heat to the fluid in the flow path to raise the temperature of the fluid. Temperature responsive means connected with the housing extends into the flow path at a point therein downstream of the heating means. The temperature responsive means is operatively connected with the heating means for reducing the heat supplied thereby whenever the temperature of the fluid exceeds a predetermined value. It will be appreciated that in this manner heated fluid, up to but not exceeding a predetermined value, is continuously passed into the internal circulation passages in the diver's clothing to keep the diver in a warmed condition.

In an important aspect of the invention the housing is of sufficient size to be portable by the diver and is provided with securing means for securing the housing to the diver's clothing.

Additionally, the pump means and the heating means are electrically operated and connected electrically to a source of electric power positioned remotely of the housing. The temperature responsive means further includes an electrical thermostat for reducing the supply of electrical power to the heating means whenever the temperature of the fluid exceeds the predetermined value.

In more detail, the heating means includes independent first and second heating means, with the thermostat means further including separate first and second thermostat means. The first thermostat means reduces the supply of electrical power to the first heating means whenever the temperature of the heated fluid exceeds a predetermined operating temperature, and the second thermostat means reduces the supply of electrical power to the second heating means whenever the temperature of the heated fluid exceeds a predetermined maximum temperature which is higher than the predetermined operating temperature. With this arrangement, one of the heating means operates substantially all the time unless the predetermined maximum temperature is exceeded, while the other heating means turns on and off as necessary to maintain the predetermined operating temperature, which is less than the maximum temperature.

Significantly, the apparatus may be used with diving clothing of the type previously described but wherein the diving clothing is additionally provided with an outlet connection communicating with the internal passages in the diver's clothing for conducting the fluid away. For this purpose, the previously described housing unit further includes an enclosed second chamber not communicating with the main chamber. The second chamber is adapted for fluid connection with the outlet connection of the diver's clothing to receive fluid therefrom. The second chamber is also in fluid communication with the pump inlet means so that fluid is pumped from the second chamber to the main chamber. However, in an important feature of the invention, a selectively operable bypass valve means is provided for passing a selectively controlled proportion of the fluid in the main chamber directly into the second chamber. The bypassed fluid passes from the second chamber to the pump inlet means and thence back into the fluid flow path for further heating. In this manner, a selected proportion of the recirculated fluid is caused to bypass the diver's clothing and recycled directly. This selective control of the bypass valve provides an additional fine control of the diver's temperature.

In another apparatus aspect, the invention is particularly adapted for use in conjunction with a diving suit of the type considered, further provided with pressurized breathing apparatus. The pressurized breathing apparatus is connected to a remote source of gas under a pressure generally equal to the ambient water pressure at which the diver is positioned. The pumping, thermostat and heating means are provided with electrical connections positioned outside the previously mentioned fluid filled chambers. The electrical connections are enclosed within gas-filled chambers which are connected with the diver's breathing apparatus connections. This provides a gas atmosphere surrounding the electrical connections, at a pressure substantially equal to the ambient water pressure surrounding the unit. This gas pressure diminishes the possibility of electrical arcing at the electrical connections and, in addition, maintains the rigidity of the unit against collapse under the heavy external water pressures encountered when operating at substantial depths.

A method aspect of the invention is intended to supply heated fluid to a diver's clothing of the type including a fluid inlet connection communicating with internal fluid circulation passages in the clothing. The method includes the steps of pumping the fluid from a source thereof into an enclosed chamber and of directing fluid in a flow path through the chamber to an outlet communicating with the inlet to the diver's clothing. Heat is supplied to the fluid in the flow path to raise the temperature of the fluid. The temperature of the fluid in the flow path subsequent to heating is sensed and the supply of heat is reduced whenever the sensed temperature of the fluid exceeds a predetermined value.

When the diver's clothing is of the previously mentioned type also including an outlet connection communicating with the internal fluid circulation passages in the clothing, the method step of pumping fluid into the main chamber is divided into a number of separate steps. These separate steps include an initial step of receiving fluid from the outlet connection of the diver's clothing in a second enclosed chamber not communicating directly with the main chamber. The fluid is then pumped from the second chamber into the main chamber to enter the flow path. A selectively variable proportion of the fluid in the main chamber is bypassed directly back into the second chamber to pass back to the main chamber for heating again. The provision of bypassing fluid in this manner provides an additional method of controlling the temperature of the fluid in the diver's clothing.

THE DRAWINGS

A heating unit constructed in accordance with a preferred embodiment of the invention is illustrated in the accompanying drawings in which:

FIG. 1 is a perspective view of a heating unit according to one preferred embodiment of the invention shown mounted on a diver wearing clothing of the type with which the heating unit is intended for use;

FIG. 2 is a cross-sectional front view of the heating unit shown in FIG. 1;

DETAILED DESCRIPTION

Figure 3:
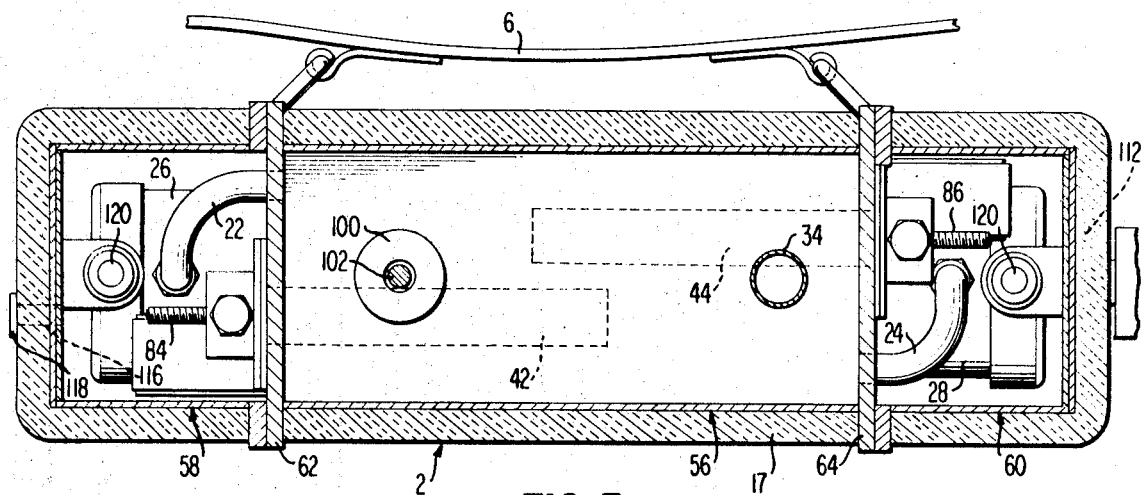
FIG. 3 is a cross-sectional top view of the heating unit shown in FIG. 2 taken along the lines 3-3 therein.

Referring to FIG. 1, a heating unit for supplying heated fluid to a diver's clothing is there shown. The heating unit includes a housing, generally designated 2, portably mounted on the body of a diver 4, by a belt 6 passing about the diver's waist. The belt 6 supports the housing 2 with its rear surface positioned generally over the diver's stomach. The diver 4 is wearing diver's clothing of the type provided with internal fluid circulation passages (not shown) through which fluid may be passed in heat exchanging relation with adjacent portions of the diver's body through the thickness of the passage walls. Heated fluid, in the present instance heated water, is supplied to the internal fluid passages through a fluid inlet connection 8 provided on the clothing. After the water has passed through the internal circulation passages in the clothing it is delivered to a fluid outlet connection 10. The diver's clothing further includes a conventional pressure helmet 12 provided with a breathing mix conduit 14. The breathing mix conduit 14 extends away to a remote source of breathing air provided at a pressure substantially equal to the ambient water pressure at which the diver is operating. Additionally the diver is provided with an electrical line 16 to the helmet containing the usual electrical telephonic conduits as well as a supply line for electrical power.

The housing 2, shown in more detail in FIG. 2, comprises a generally rectangular, hollow, watertight container having left and right ends 15 and 16. The housing 2 is covered by a thick layer of elastomeric material 17 which provides thermal insulation for the heated liquid in the housing. Additionally, the layer of material 17 enhances the watertight qualities of the unit and provides protection against bumps, scuffing and the like.

The interior of the container is divided by partitioning into a liquid filled main chamber A and a liquid filled, second chamber B. The chambers A and B are not in direct fluid communication with each other. Liquid leaving the diver's clothing through the outlet connection 10 passes through an inlet connector 20 secured to a generally horizontal upper surface of the housing 2, into the second liquid chamber B. The liquid in the second chamber B is withdrawn through left and right conduits 22 and 24, respectively, at opposite ends of the second chamber B by left and right, or first and second, electrically powered pumps 26 and 28, respectively. The pumps 26 and 28 discharge into a common chamber C which communicates with the main chamber A.

Two baffles 30 and 32 within the main chamber A cause the liquid passing therethrough to follow a tortuously configured fluid flow path through the main chamber A towards a main chamber outlet 34. The main chamber outlet 34 communicates, via an outlet connector 36 provided in the housing 2, with the previously mentioned inlet connection 8 to the diver's clothing to deliver liquid from the main chamber A to the diver's clothing.

To raise the temperature of the liquid in the chamber, left and right, or first and second, heating elements 38 and 40 are provided. The heating elements which are positioned between and parallel to the baffles 30 and 32 extending into the main chamber, supply heat to the liquid so that its temperature is raised. In this way a constant supply of warmed liquid is delivered to the fluid circulation passages in the diver's clothing to keep the diver warm.

To maintain control over the temperature of the liquid entering the suit for the purposes of the diver's comfort, the unit includes left and right, or first and second, electrical thermostats 42 and 44, respectively, which extend into the main chamber A above an upper side of the baffle 32 remote from the heating units 38 and 40. The thermostats 42 and 44 are responsive to the temperature of the heated liquid in the fluid flow path subsequent to the application of heat thereto by the first and second heating elements 38 and 40.

As will be described in more detail hereinafter, the first thermostat 42 is operatively connected with the first heating element 38 to discontinue the supply of electrical power thereto whenever the temperature of the liquid exceeds a predetermined operating value. Similarly, the second thermostat 44 is operatively connected with the second heating unit 40 to discontinue the supply of electrical power thereto whenever the temperature of the heated fluid exceeds a predetermined maximum value which is higher than the predetermined operating temperature.

In this manner, the second heating element continues to function continuously unless dangerous overtemperature conditions occur, while the first heating element may cut off and on as frequently as is necessary to maintain the heated liquid at the selected operating temperature.

Additional control over the temperature of the liquid passing through the diver's clothing is provided by a selectively operable bypass valve 50. The valve 50 may be selectively opened to permit passage of a selected proportion of liquid directly from the main chamber A to the second chamber B as the liquid in the main chamber A (being in communication with the outlet side of the pumps 26 and 28) is at higher pressure than the liquid in the second chamber B (communicating with the inlet side of the pumps). Thus a proportion of the liquid passing through the main chamber A is bypassed directly back into the main chamber B thereby correspondingly reducing the rate of liquid flow out of the main chamber to the diver's clothing.

As the outlet temperature of the liquid is controlled to a constant value by the thermostats a reduced rate of flow to the clothing correspondingly reduces the heat supplied to the diver. Thus, by opening and closing the bypass valve 50 manually, the diver is selectively able to decrease and increase, respectively, the heat supplied to him in such a manner as to optimize his comfort.

Significantly, this control, which is effected by a hand adjustment of the bypass valve 50 on the top of the unit, may be effected by the diver while he is immersed without requiring removal of the unit to the surface for adjustment of the thermostats.

In another important aspect of the invention, the electrical connections to the first pump 26, the first heating element 38 and the first thermostat 42 are all positioned outside the liquid filled chambers A, B and C, within an air filled left end chamber D forming part of the housing 2. Similarly the electrical connection to the second pump 28, the second heating element 40 and the second thermostat 44 are all positioned within an air filled right end chamber E positioned at the right end of the interior of the housing 2. The gas chambers D and E are in fluid communication with each other through a connecting gas conduit 50. The chamber E is in fluid communication with the previously mentioned breathing mix connection 14 to the diver's pressure helmet, with the result that the electrical connectors and the internal gas chambers are gas pressurized to a pressure generally corresponding to the external ambient water pressure. In this way, collapse of the gas filled portions of the housing under extreme external water pressures is prevented, and additionally the high prevailing internal gas pressure minimizes the possibility of arcing at any of the electrical connections.

Detailed Structure

The previously mentioned housing 2 (FIG. 2) comprises a central subhousing 56 and left and right end subhousings 58 and 60, respectively. Each of the housings 56, 58 and 60 (FIG. 3) comprises an open-ended tube having a generally flat horizontal upper wall, spaced opposed front and rear vertical walls depending from the upper wall and a semicircular bottom wall.

To close the open ends of the central subhousing 56, left and right vertically extending bulkheads 62 and 64, respectively, are provided. Each bulkhead extends across the adjacent open end of the central subhousing 56 and is fixedly secured thereto by welding or the like, to enclose the interior of the central subhousing 56 in fluidtight relation.

To provide the previously mentioned second chamber B, an upper interior wall 66 extends fixedly along and across the interior of the central subhousing 56 spaced below the upper wall thereof. The upper interior wall 66, adjacent portions of the bulkheads 62 and the adjacent interior wall portions of the central subhousing 56 together provide the fluidtight second chamber B.

The previously mentioned main chamber A is bounded at its lower extremity by a lower interior wall 68 of the housing in fluidtight relation therewith. The upper and lower interior walls 66 and 68, adjacent portions of the bulkhead 62 and 64 and the front and rear walls of the central subhousing 56 together define the main chamber A.

To permit liquid to enter the main chamber A from the previously mentioned common chamber C, a centrally positioned opening 70 is provided in the lower interior wall 68. The housing 70 is defined by two spaced opposed edges 71 and 72 extending perpendicularly between the front and rear walls.

The previously mentioned common chamber C extends downwardly from the opening 70 to the bottom wall of the central subhousing 56. The chamber 6 is bounded by vertical, left and right walls 74 and 76, respectively depending from the lower interior wall 68 adjacent the edges 71 and 72 of the opening 70.

The previously mentioned left, or first, pump 26 is positioned generally horizontally with its left end positioned outside the central subhousing 56 and with the body of the pump extending sealingly through an aperture in the left bulkhead 62. The inner or right end of the first pump 26 is fixedly secured to the left inner bulkhead 74 with the outlet of the pump 26 communicating with the common chamber C.

Similarly the right, or second, pump 28 extends sealingly through an opening in the right bulkhead 64, and the left end of the pump 28 is secured to the right inner bulkhead 78 with the pump outlet communicating with the common chamber C.

The pumps 26 and 28 are electrically powered, rotary, liquid displacement pumps giving a substantially constant rate of liquid throughout at their operating voltage. In the preferred embodiment the pumps are of the type manufactured by Bendix Corp. of Detroit, Mich. under the model designation No. 478148.

Liquid is supplied to the inlet of the pump 26 through the previously mentioned conduit 22 which communicates with the left end of the second chamber B with the conduit 22 being positioned outside the central subhousing 56. Similarly, liquid is supplied to the inlet of the right pump 28 by the previously mentioned conduit 24 which communicates with the second chamber B at the right end thereof, with the second conduit 24 also being positioned outside the central subhousing 56.

As previously mentioned, heating for the liquid in its passage through the main chamber A is provided by the first and second heating elements 38 and 40, each of which comprises a cantilever mounted, conventional, electrical immersion heater. The first heating element 38 extends sealingly through an aperture in the left bulkhead 62 into the interior of the central subhousing 56 and extends horizontally thereacross in spaced parallel relation between the baffles 30 and 32 almost to the right bulkhead 64. Similarly, the second heating element 40 extends sealingly through the right bulkhead 64 into and across the interior of the central subhousing 56 almost to the left bulkhead 62. The heating elements are disposed generally in the same horizontal plane with the left heating element 38 spaced in front of the rear of the vertical wall of the central subhousing 56 and the right heating element 40 spaced behind and parallel to the front vertical wall of the central subhousing 56.

To ensure that the liquid gains the maximum amount of heat put out by the heating elements, the previously mentioned baffles 30 and 32 define a fluid flow path which for a substantial distance, flows closely along and adjacent the heating elements 38 and 40. For this purpose, the lower baffle 30 is spaced below and closely adjacent the heating elements. The baffle 30 has a closed left end wall 82 extending downwardly into fixed connection with the lower interior wall 68 and extends between the front and rear walls of the central portion 56 to cause fluid entering through the opening 70 to move toward the right end bulkhead 64. The lower baffle 30 terminates a short distance before the right end bulkhead 64 so that the liquid is then deflected upwardly above the baffle 30 by the bulkhead 64.

The upper baffle 32 is spaced above the heating elements and extends from the right bulkhead 64, to direct fluid along the heating elements towards the left bulkhead 62. The upper baffle 32 terminates a short distance before the left bulkhead so that the liquid is then directed upwardly thereby above the baffle 32 to pass in a reverse direction, along the channel defined by the baffle 32 and the upper interior wall 66.

The liquid passes over the previously mentioned left and right thermostats 42 and 44, respectively, on its passage toward the outlet 34. The left thermostat 42 passes sealingly through an opening in the left bulkhead 62 while the right thermostat 44 passes sealingly through the right bulkhead 64. Both thermostats are generally horizontally positioned and centralized vertically between the baffle 32 and upper interior wall 66, with the left thermostat 34 being parallel to and displaced forwardly of the right thermostat 42. The left thermostat 42 includes a horizontally projecting, adjusting screw 84 projecting into the left gas chamber D. Similarly, the right thermostat 44 is provided with a corresponding adjusting screw 86 projecting into the right end chamber E. Each of the thermostats is of a conventional type which may be set to break an electrical circuit whenever the temperature sensed by the thermostat exceeds a predetermined value set by adjustment of the appropriate one of the control screws 84 and 86.

The heated liquid leaving the main chamber A passes through the previously mentioned main chamber outlet 34 which extends through the second channel B but is not in fluid communication therewith. From there the fluid passes through the connector 36 to the inlet connection 8 to the diver's clothing.

The connector 36 may be of any suitable commercially available type and is provided with a conventional valve 90 which may be turned by hand to shut off flow through the connector 36.

Similarly the previously mentioned inlet valve 20, which is fixedly connected to the upper wall of the central subhousing 56 generally central thereof, is also provided with a conventional valve 92 which may be turned by hand to shut off flow of fluid through the connector 20 into the second chamber B.

As indicated earlier, the diver is provided with the bypass valve 50 for bypassing a proportion of fluid from the main chamber A directly back into the second chamber B. The bypass valve 50 comprises a conically ported valve seat 100 secured to the upper surface of the interior wall 66, for placing the main and second chambers A and B in fluid communication. Flow through the valve seat 100 is controlled by a conical valving member 102 mounted in a valve body 104 secured to the upper wall of the central portion 56 of the housing. Opening and closing of the valving member 102 is controlled by the diver turning a handwheel 106 to selectively vary the size of opening through the valve seat 100 and hence the rate of passage of liquid therethrough.

It will be appreciated that as the valve 50 is opened to increase the proportion of fluid being bypassed, the remaining amount of fluid being cycled through the diver's clothing is correspondingly reduced. However, as the temperature of fluid leaving the chamber A remains substantially constant due to the action of the previously mentioned thermostats 42 and 44, a reduced rate of flow of liquid through the suit must cause a corresponding reduction in the rate of supply of heat to the diver. Thus, if the diver feels too warm, he may reduce the heat being supplied to him by simply opening the valve 50. Conversely, if he later starts to feel too cold, he may increase the supply of heat to him by progressively closing the bypass valve.

Very significantly, the bypass valve 50 permits the diver to easily make adjustments to the flow of fluid in such a way as to provide the most comfortable temperature in the diving clothing even while he is immersed during diving operations when it would not be possible for the diver to control his temperature by making adjustments to the thermostats.

Additionally, when the unit is about to be placed in use just prior to diving after a period of nonuse, the inlet and outlet valves may be entirely closed and the entire output of the pump be recycled through the bypass valves and over the heating elements to very rapidly build up the temperature of the body of liquid in the unit to operating temperature. The unit may then be connected to the diver's clothing and the inlet and outlet valves opened in the normal way. Thus, the unit may rapidly be heated in readiness for operation after a period of nonuse, by employment of the bypass valve.

The outer ends of the various pumps and thermostats are enclosed within the end subhousings 58 and 60 which, as previously described, comprise tubular bodies of the same peripheral configuration as the wall of the central subhousing 56 arranged in alignment therewith. Each of the end subhousings 58 and 60 is closed at its outer, open end by a vertical end plate 110. The inner, open end of each of the end subhousings 58 and 60 has secured thereto an outwardly directed, peripherally extending metal flange 112 fixedly secured in abutting, sealing contact to the adjacent outwardly facing surface of the adjacent one of the bulkheads 62 and 64 of the central subhousing 56. The interior of each of the end housings 58 and 60 defines the two previously mentioned fluidtight gas filled, end chambers D and E, respectively.

Figure 4:
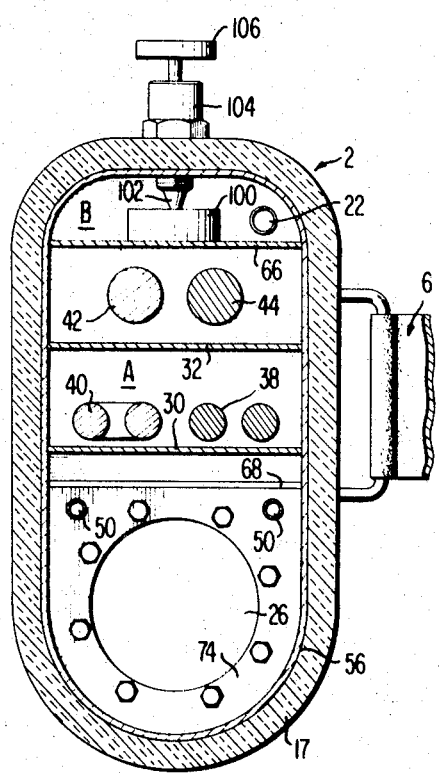
FIG. 4 is a cross-sectional end view of the heating unit shown in FIG. 2 taken along the lines 4-4 therein.

To prevent collapse of the gas filled, end chambers D and E due to high external ambient water pressures, the end chambers are pressurized internally to a gas pressure generally equal to that of the external water pressure. For this purpose, the right, end subhousing 60 is provided with an opening 112 which sealingly communicates with a detachable flexible conduit 114 (FIG. 1) to the diver's breathing mix connection 14 which, it will be remembered, communicates with a remote source of breathing air at a pressure substantially equal to the ambient water pressure. To permit the same pressure as is applied to the gas filled right end chamber E to be applied to the gas filled left end chamber D, the previously mentioned hollow tubular pipes 50 (FIG. 4) are sealingly mounted in and extend between the walls 74 and 76. The gas pressure applied to the chambers D and E not only serves to maintain their rigidity against the external forces exerted by the water pressure, but in addition, advantageously provides a high-pressure atmosphere which reduces any possible arcing of the electrical connections to the pumps 26 and 28, the heating units 38, 40 and the thermostats 84 and 86.

In order to facilitate adjustment of the thermostat 44 when this unit is above the surface and not in use, the previously mentioned breathing mix connection opening 112 is aligned axially with the adjusting screw 86 of the second thermostat 44. When the breathing mix conduit 114 is disconnected, a suitable tool (such as, for example, a screwdriver) may be inserted through the aperture 112 to turn the screw 86 to vary the temperature setting of the thermostat 44.

To provide for similar adjustment of the adjustment screw 84 of the first thermostat 42, a second aperture 116 (FIG. 3) is provided in the left end housing 58 aligned axially with the screw 84. The aperture 16 is closed in watertight relation by a plug 118 when the unit is immersed. On the surface, the plug 118 may be removed and a suitable adjusting instrument inserted through the aperture 116 to turn the screw 84 to alter the predetermined temperature value for which the first thermostat 42 is set.

Two electrical fuses 120 (FIG. 2) of a conventional type, are provided, positioned on opposite sides of the unit in the chambers D and E, respectively. Each of the fuses 120 is supported by bracket 122 connected to the adjacent end subhousing, with the fuse in a generally vertical orientation with its upper end adjacent the upper wall of the subhousing. An aperture 124 in each of the end subhousings 58 and 60 adjacent the upper end of each fuse 120 permits the fuse to be removed for replacement, if necessary, when the unit is above surface. When immersed, the openings 124 are closed by sealing plugs 126.

Figure 5:
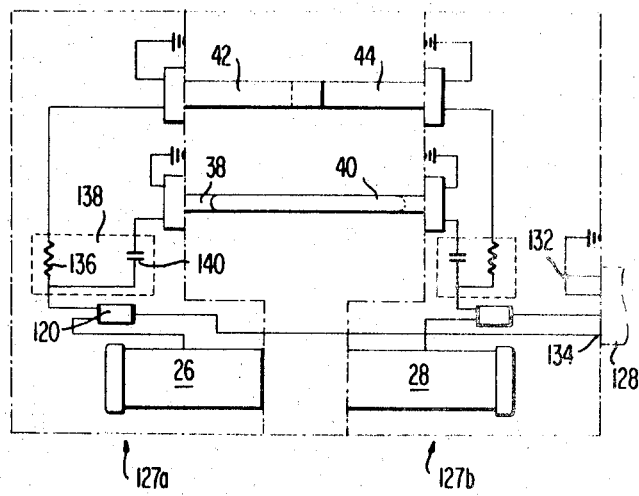
FIG. 5 is a simplified schematic view of an electrical circuit forming part of the heating unit shown in FIG. 1.

The electrical circuit controlling the operation of the various electrical elements thus far described, is shown in a simplified schematic form in FIG. 5. As will be seen, two similar but independent subcircuits 127a and 127b are provided. The subcircuit 127a includes the first pump 26, the first heating element 38 and first thermostat 42, while the subcircuit 127b includes the second pump 28, the second heating element 40 and the second thermostat 44.

Considering the first subcircuit 127a, electrical power is delivered to the circuit from an electrical connector 128 (FIG. 2) connected via a watertight, plug-in electric cable 130 (FIG. 1) to the previously mentioned electrical and telephonic supply line 16 to the diver's helmet. The electrical connector 128 (FIG. 5) includes an earth connection 132 to the interior of the housing 2 and a live connection 134 to the one of the previously mentioned fuses 120 associated with the first subcircuit 127a. One electrical output path from the fuse 120 delivers electrical power to the first electrically-powered pump 26. Another output connection from the fuse 120 passes through the operating coil 136 of a relay 138 and through contacts (not shown) controlled by the first thermostat 42 to earth.

When the temperature sensed by the first thermostat 42 is less than the predetermined operating temperature for which the thermostat is set, the contacts controlled by it are closed so that a current path through the relay coil 136 exists. During this time, a pair of electrical contacts 140 controlled by the relay coil 136 are closed to complete a current path through the first heating element 38 to earth, so that the heating element 38 provides heat to the liquid passing through the main chamber. When the temperature of the liquid exceeds the predetermined value, the thermostat contacts 42 open to deactivate the relay 130 which opens the relay contacts 140 to disconnect the source of electric power from the first heating element 38 which therefore ceases to deliver heat to the liquid. When the temperature drops below the predetermined operating temperature again, the thermostat contacts close to reactivate the relay 130 to complete the power circuit to the heating element 38.

The second electrical subcircuit 127b contains corresponding circuit elements to the first subcircuit 127a and functions in a similar manner to that described. However, the second thermostat 44 is set to cutoff the power circuit to the second heating element 40 at a predetermined maximum temperature in excess of the previously mentioned operating temperature.

In this manner, the second heating element is turned off only when the temperature of the liquid exceeds a dangerous maximum value rather than being cutoff and on to maintain a predetermined operating value like the first subcircuit.

SUMMARY OF ADVANTAGES

It will be appreciated that in following the method and apparatus of the present invention to supply heated fluid to diver's clothing, certain significant advantages are provided.

Of particular importance is the fact that the method and apparatus described permits a diver's clothing to be supplied with heated fluid without requiring the provision of extra, bulky and extensive fluid and power conduits extending to the diver from the surface or from a diving bell.

Also of major significance is the manner in which the invention provides for virtually unlimited operation so long as the diver remains connected to an electrical power source, thereby eliminating disadvantages of prior systems which could function only for relatively restricted periods of time.

Another particularly significant aspect of the invention resides in the provision of the bypass valve which permits the diver, while he is immersed, to vary the quantity of fluid flowing through the suit in such a manner as to obtain the most comfortable temperature without any necessity for the diver to return to the surface so that various electrical thermostats and the like may be adjusted.

The bypass valve is further advantageous in that it permits the unit to be readily brought up to operating temperature after periods of nonuse, by simply recycling the fluid over and over the heating units prior to use until the fluid reaches the predetermined operating temperature.

Also important is the manner in which the invention utilizes a closed cycle liquid system to reduce the heating requirements. Additionally the closed cycle system avoids producing clouds of bubbles or other disturbing phenomenon which might hinder a diver's ability while working or otherwise impair his freedom of action.

Also significant is the compact construction of the unit which enables it to be attached to a diver's clothing so that it may be moved about easily with the diver from one location to another, without substantially restricting the diver's freedom of movement.

Although the invention has been described with reference to one preferred embodiment, it will be appreciated by those skilled in the art that numerous additions, deletions, substitutions, modifications and other changes not specifically disclosed or described may be made which will fall within the purview of the appended claims.

We claim:

1. Apparatus for supplying heat to a diver submerged in a body of water, the apparatus comprising:
    a garment adapted to be worn by the diver and including:
        internal fluid circulation passages through which fluid may be passed in heat exchanging relation with adjacent portions of the body of the diver through the thickness of the walls of said passages,
        fluid inlet means communicating with said internal fluid circulation passages, and
        fluid outlet means communicating with said internal fluid circulation passages;
    a source of electrical power positioned remotely from said housing;
    a source of gas under pressure generally equal to the ambient water pressure at which the diver is positioned, said source of gas under pressure being positioned remotely from said housing;
    a heating unit for supplying heated fluid to said internal fluid passages in closed, fluid recirculating relationship, said heating unit comprising:
        a housing having,
            an enclosed main chamber, and
            an enclosed second chamber;
        main chamber outlet means providing fluid communication between said main chamber and said fluid inlet means communicating with said internal fluid circulation passages;
        second chamber inlet means providing fluid communication between said second chamber and said fluid outlet means communicating with said internal fluid circulation passages;
        electrically powered pumping means mounted in said housing and comprising:
            pump inlet means for withdrawing fluid from said second chamber, and
            pump outlet means communicating with said main chamber for delivering the fluid thereto, said chamber outlet means and said pump outlet means being positioned at opposite ends of a fluid flow path through said main chamber;

electrically powered heating means mounted in said housing and extending into said flow path for supplying heat to the fluid passing through said main chamber;

temperature responsive electrical thermostat means mounted in said housing and extending into said flow path at a point therein downstream of said heating means, said thermostat means being operatively connected with said heating means to reduce the electrical supply thereto when the temperature of the fluid exceeds a predetermined value;

said pumping means, said heating means and said thermostat means further including electrical connection terminals for connection of electrical power to said pumping means, said heating means and said thermostat means, said electrical connection terminals being connected through electrical cable means to said source of electrical power positioned remotely from said housing and being positioned externally of said main chamber;

said housing further including, gas chamber means extending about and enclosing said electrical connection means and isolated from the fluids flowing through said heating unit, and gas connection means in fluid communication with said gas chamber and connected to said source of gas under pressure generally equal to the ambient water pressure at which the dive is positioned;

selectively and manually operable bypass valve means connected with said housing for passing a selectively variable proportion of the fluid in said main chamber directly back into said second chamber; and valve means interposed between said main chamber outlet means and said fluid inlet means communicating with said fluid circulation passages.

2. A heating unit as defined in claim 1 wherein, said housing is of sufficient size to be portable by the diver, and securing means is provided adapted to secure said housing to the diver's clothing.

3. A heating unit as defined in claim 1 further including, baffle means connected with said housing extending into said main chamber for configuring said flow path to extend generally closely about said heating means.

4. A heating unit as defined in claim 1 wherein, said heating means further includes first and second independent heating means;

and said thermostat means further includes, independent first and second thermostat means operatively connnected with said first and second heating means respectively, said first thermostat means for reducing the supply of electrical power to said first heating means whenever the temperature of the heated fluid exceeds a predetermined operating temperature;

said second thermostat means for reducing the supply of electrical power to said second heating means whenever the temperature of the heated fluid exceeds a predetermined maximum temperature higher than said predetermined operating temperature.

UNITED STATES PATENT OFFICE
CERTIFICATE OF CORRECTION

Patent No. 3,558,852                Dated January 26, 1971

Inventor(s) Leroy N. Larenzo et al.

It is certified that error appears in the above-identified patent and that said Letters Patent are hereby corrected as shown below:

On the cover page, column 1, after "References Cited UNITED STATES PATENTS" cancel lines 1, 2 and 3, and insert the following:

| | | | |
|---|---|---|---|
| 1,896,953 | 2/1933 | Hassell | 165/46 |
| 1,905,439 | 4/1933 | Carleton | 219/297X |
| 2,259,401 | 10/1941 | Tucker et al | 219/297 |
| 2,418,283 | 4/1947 | Wilson | 219/354X |
| 2,511,635 | 6/1950 | Holmes | 219/297 |
| 2,710,908 | 6/1955 | Doniak | 219/298X |
| 2,753,435 | 7/1956 | Jepson | 219/212X |
| 2,825,791 | 3/1958 | Jackson | 219/365X |
| 2,982,841 | 5/1961 | MacCracken | 219/212X |
| 3,227,208 | 1/1966 | Potter et al | 219/325(UX) |
| 3,402,709 | 9/1968 | Shivers et al | 165/46X |

FOREIGN PATENTS

| | | | |
|---|---|---|---|
| 402,088 | 11/1933 | Great Britain | 128/400 |
| 861,633 | 2/1961 | Great Britain | 219/321 |
| 1,072,376 | 6/1967 | Great Britain | 219/528 |

Signed and sealed this 27th day of June 1972.

(SEAL)
Attest:

EDWARD M. FLETCHER, JR.
Attesting Officer

ROBERT GOTTSCHALK
Commissioner of Patent